(12) United States Patent
Yi et al.

(10) Patent No.: US 10,432,289 B2
(45) Date of Patent: *Oct. 1, 2019

(54) METHOD AND APPARATUS FOR PROCESSING APERIODIC CHANNEL STATE INFORMATION IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Jonghyun Park, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,034

(22) Filed: Apr. 20, 2018

(65) Prior Publication Data

US 2018/0241455 A1 Aug. 23, 2018

Related U.S. Application Data

(63) Continuation of application No. 15/303,897, filed as application No. PCT/KR2015/003827 on Apr. 16, 2015, now Pat. No. 9,979,455.

(Continued)

(51) Int. Cl.
| | |
|---|---|
| *H04B 7/06* | (2006.01) |
| *H04W 76/16* | (2018.01) |
| *H04W 88/02* | (2009.01) |
| *H04W 76/15* | (2018.01) |
| *H04B 7/024* | (2017.01) |

(Continued)

(52) U.S. Cl.
CPC .......... *H04B 7/0626* (2013.01); *H04B 7/024* (2013.01); *H04B 7/0456* (2013.01); *H04B 7/0647* (2013.01); *H04W 76/15* (2018.02); *H04W 76/16* (2018.02); *H04L 5/0057* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | |
|---|---|---|
| 2011/0305161 A1 | 12/2011 | Ekpenyong et al. |
| 2014/0086174 A1 | 3/2014 | Nam et al. |

(Continued)

FOREIGN PATENT DOCUMENTS

| | | |
|---|---|---|
| CA | 2873611 | 12/2013 |
| CN | 103004116 | 3/2013 |

(Continued)

OTHER PUBLICATIONS

European Patent Office Application Serial No. 15779893.5, Search Report dated Oct. 26, 2017, 10 pages.

(Continued)

*Primary Examiner* — David Bilodeau
(74) *Attorney, Agent, or Firm* — Lee Hong Degerman Kang & Waimey

(57) ABSTRACT

A method and apparatus for processing aperiodic channel state information (CSI) in a wireless communication system is provided. A user equipment (UE), receives a request for aperiodic CSI report, and assigns capability of the aperiodic CSI report for a master evolved NodeB (MeNB) and a secondary eNB (SeNB) in dual connectivity.

12 Claims, 8 Drawing Sheets

Related U.S. Application Data

(60) Provisional application No. 61/980,531, filed on Apr. 16, 2014, provisional application No. 62/086,673, filed on Dec. 2, 2014.

(51) Int. Cl.
*H04B 7/0456* (2017.01)
*H04W 88/08* (2009.01)
*H04L 5/00* (2006.01)

(56) References Cited

U.S. PATENT DOCUMENTS

| | | | |
|---|---|---|---|
| 2015/0049626 | A1 | 2/2015 | Chen et al. |
| 2015/0085750 | A1 | 3/2015 | Zhang et al. |
| 2015/0117380 | A1 | 4/2015 | Zhang et al. |
| 2015/0244444 | A1 | 8/2015 | Mazzarese et al. |
| 2015/0289144 | A1 | 10/2015 | Yi et al. |
| 2015/0295694 | A1 | 10/2015 | Li et al. |
| 2015/0319753 | A1 | 11/2015 | Chen et al. |
| 2016/0142191 | A1 | 5/2016 | Davydov et al. |
| 2016/0212775 | A1 | 7/2016 | Xu et al. |
| 2016/0323078 | A1 | 11/2016 | Takeda et al. |
| 2017/0041059 | A1 | 2/2017 | Yi et al. |

FOREIGN PATENT DOCUMENTS

| | | |
|---|---|---|
| JP | 2015534390 | 11/2015 |
| WO | 2013069536 | 5/2013 |
| WO | 2013112024 A1 | 8/2013 |
| WO | 2013148347 A1 | 10/2013 |
| WO | 2014051333 A1 | 4/2014 |

OTHER PUBLICATIONS

NTT DOCOMO, "Viewson remaining issues on dual connectivity", 3GPP TSG RAN WG1 Meeting #76bis, R1-141470, Apr. 2014, 5 pages.
Fujitsu, "Discussion on aperiodic CSI feedback for CoMP transmission", 3GPP TSG RAN WG1 Meeting #70, R1-123348, Aug. 2012, 4 pages.
LG Electronics, "Remaining RAN1 issues on dual connectivity", 3GPP TSG RAN WG1 Meeting #78, R1-143174, Aug. 2014, 6 pages.
Ericsson et al., "Way Forward on Limiting UE Complexity for CoMP CSI Processing", R1-123931, Aug. 17, 2012, 6 pages.
United States Patent and Trademark Office U.S. Appl. No. 15/303,897, Office Action dated Apr. 3, 2017, 14 pages.
European Patent Office Application Serial No. 15779893.5, Notice of Allowance dated Oct. 4, 2018, 31 pages.
Samsung, "L1 UE capability handling for dual connectivity", 3GPP TSG RAN WG2 Meeting #85, R2-140701, Feb. 2014, 4 pages.
Catt, "UE category related L1 processing capability for dual connectivity", 3GPP TSG RAN WG1 Meeting #76bis, R1-141364, Apr. 2014, 2 pages.
State Intellectual Property Office of the People's Republic of China Application Serial No. 201580019925.3, Office Action dated Dec. 25, 2018, 5 pages.
Japan Patent Office Application No. 2016-562908, Office Action dated Apr. 2, 2019, 2 pages.

METHOD AND APPARATUS FOR PROCESSING APERIODIC CHANNEL STATE INFORMATION IN WIRELESS COMMUNICATION SYSTEM

CROSS-REFERENCE TO RELATED APPLICATIONS

This application is a continuation of U.S. patent application Ser. No. 15/303,897, filed on Oct. 13, 2016, now U.S. Pat. No. 9,979,455, which is the National Stage filing under 35 U.S.C. 371 of International Application No. PCT/KR2015/003827, filed on Apr. 16, 2015, which claims the benefit of U.S. Provisional Applications Nos. 61/980,531, filed on Apr. 16, 2014 and 62/086,673 filed on Dec. 2, 2014, the contents of which are all hereby incorporated by reference herein in their entirety.

BACKGROUND OF THE INVENTION

Field of the Invention

The present invention relates to wireless communications, and more particularly, to a method and apparatus for processing aperiodic channel state information (CSI) in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs.

The UE may report channel state information (CSI) to the network. For downlink (DL) coordinated multi-point (CoMP), multiple transmission points are coordinated in their DL data transmission. The UE may be configured to measure and report the CSI of a set of non-zero power CSI reference signal (RS) resources. The UE may also be configured with one or more interference measurements. Each interference measurement is associated with one CSI-interference measurement (CSI-IM) resource, which is a set of REs on which the UE measures interference. The UE may also be configured with multiple CSI processes. Each CSI process defines the CSI measurement associated with one non-zero power CSI-RS resource and one CSI-IM resource. For UL CoMP, multiple reception points are coordinated in their uplink data reception.

When dual connectivity is configured, how to process CSI efficiently may be required.

SUMMARY OF THE INVENTION

The present invention provides a method and apparatus for processing aperiodic channel state information (CSI) in a wireless communication system. The present invention provides a method for splitting CSI capability when a user equipment (UE) is configured with dual connectivity and coordinated multi-point (CoMP) operation.

In an aspect, a method for processing, by a user equipment (UE), aperiodic channel state information (CSI) in a wireless communication system is provided. The method includes receiving, by the UE, a request for aperiodic CSI report, and assigning, by the UE, capability of the aperiodic CSI report for a master evolved NodeB (MeNB) and a secondary eNB (SeNB) in dual connectivity.

In another aspect, a user equipment (UE) in a wireless communication system is provided. The UE includes a memory, a transceiver, and a processor coupled to the memory and the transceiver, and configured to receive a request for aperiodic channel state information (CSI) report, and assign capability of the aperiodic CSI report for a master evolved NodeB (MeNB) and a secondary eNB (SeNB) in dual connectivity.

Aperiodic CSI can be assigned and transmitted efficiently when dual connectivity is configured.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
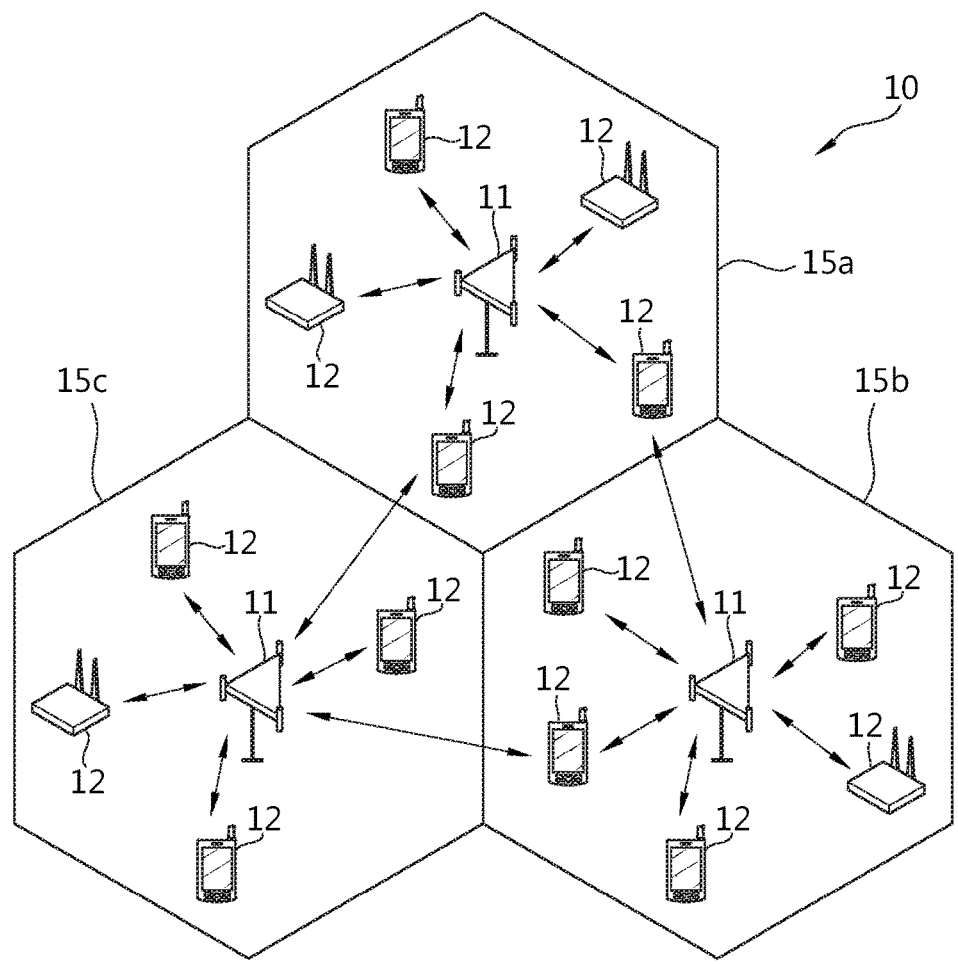
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
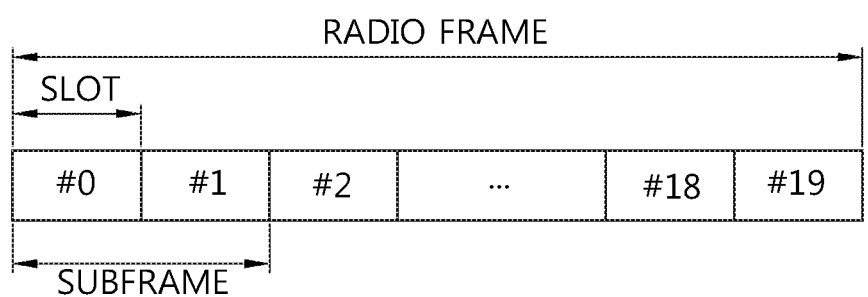
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
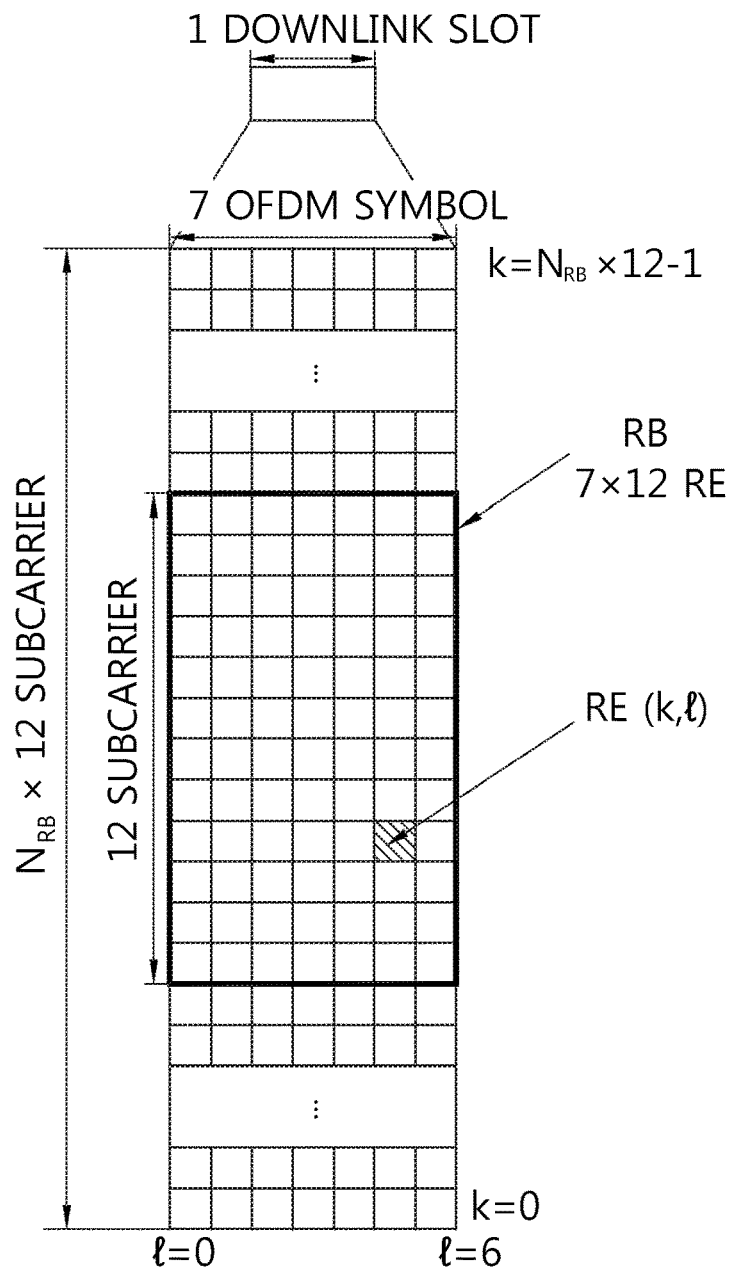
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
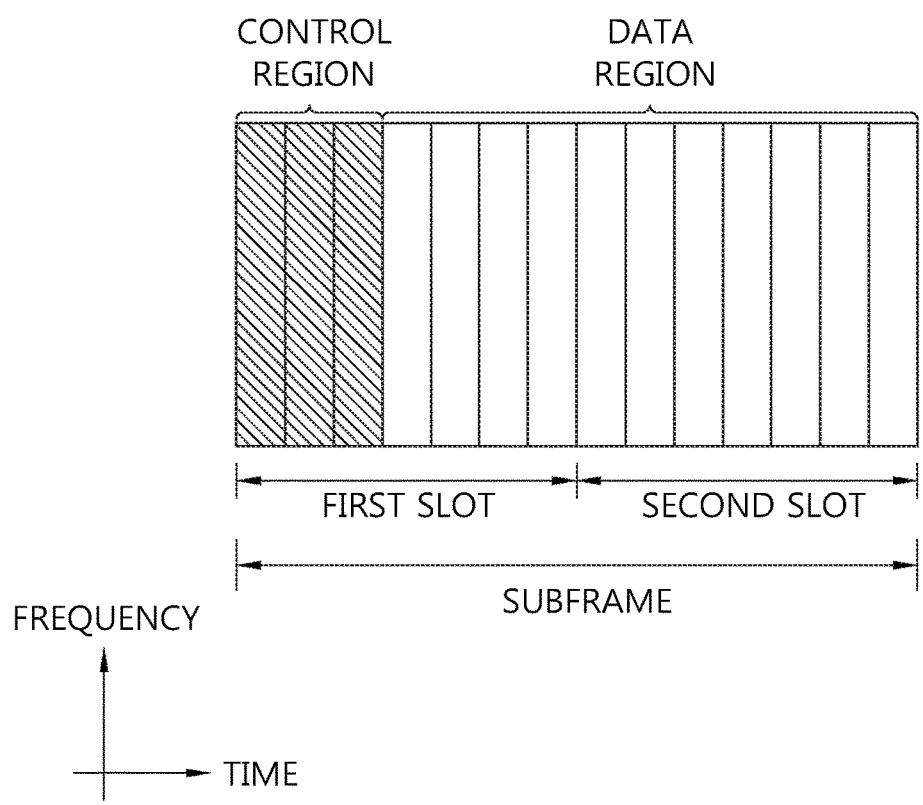
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
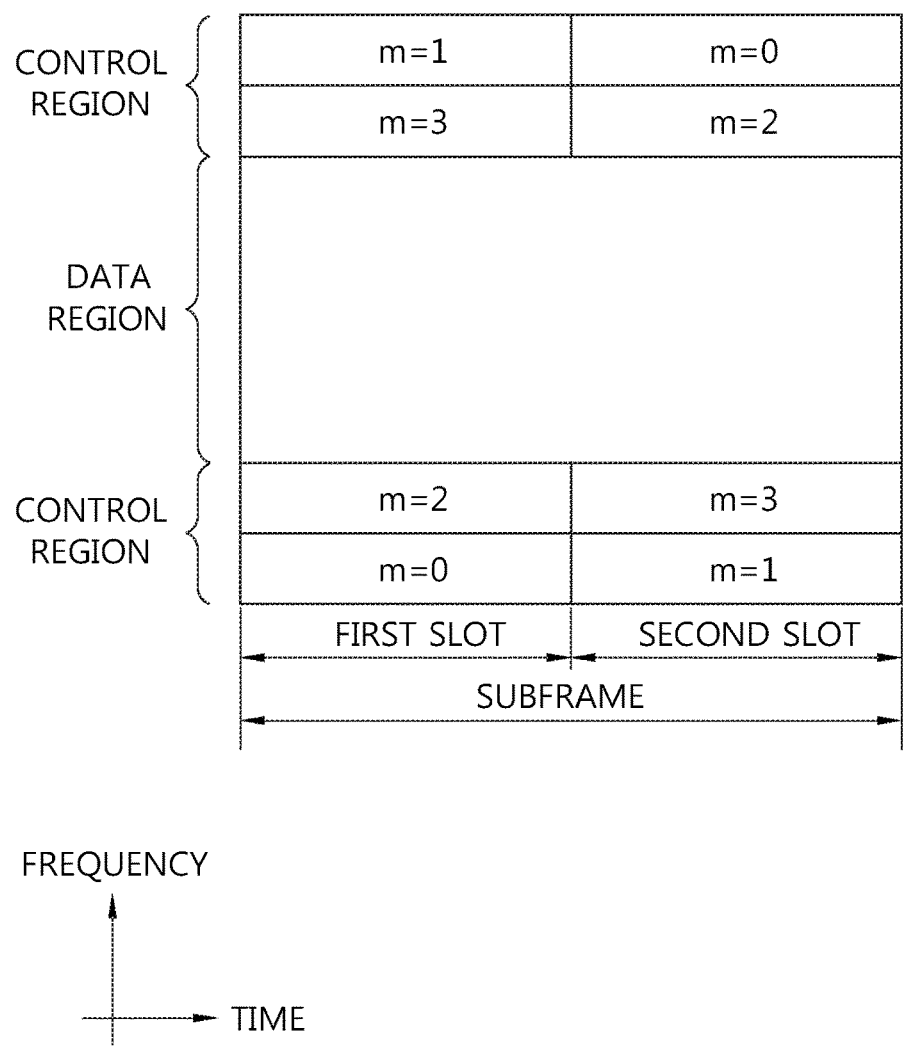
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

UE procedure for reporting channel state information (CSI) is described. It may be referred to section 7.2 of 3GPP TS 36.213 V12.1.0 (2014-03). The time and frequency resources that can be used by the UE to report CSI which consists of CQI, PMI, precoding type indicator (PTI), and/or RI are controlled by the eNB.

A UE in transmission mode 10 can be configured with one or more CSI processes per serving cell by higher layers. Each CSI process is associated with a CSI-RS resource and a CSI-interference measurement (CSI-IM) resource. A CSI reported by the UE corresponds to a CSI process configured by higher layers. Each CSI process can be configured with or without PMI/RI reporting by higher layer signaling. A UE is configured with resource-restricted CSI measurements if the subframe sets $C_{CSI,0}$ and $C_{CSI,1}$ are configured by higher layers. CSI reporting is periodic or aperiodic. If the UE is configured with more than one serving cell, it transmits CSI for activated serving cell(s) only. A UE shall transmit aperiodic CSI reporting on PUSCH if the specific conditions are met. For aperiodic CQI/PMI reporting, RI reporting is transmitted only if the configured CSI feedback type supports RI reporting. In case both periodic and aperiodic CSI reporting would occur in the same subframe, the UE shall only transmit the aperiodic CSI report in that subframe.

Table 1 shows an example of transmission modes.

TABLE 1

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |

TABLE 1-continued

| Transmission mode | DCI format | Search Space | Transmission scheme of PDSCH corresponding to PDCCH |
|---|---|---|---|
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity<br>MBSFN subframe: Single-antenna port, port 7 |
|  | DCI format 2D | UE specific by C-RNTI | Up to 8 layer transmission, ports 7-14 or single-antenna port, port 7 or 8 |

Aperiodic CSI reporting using PUSCH is described. It may be referred to section 7.2.1 of 3GPP TS 36.213 V12.1.0 (2014-03). A UE shall perform aperiodic CSI reporting using the PUSCH in subframe n+k on serving cell c, upon decoding in subframe n either an uplink DCI format, or a random access response grant, for serving cell c if the respective CSI request field is set to trigger a report and is not reserved.

If the CSI request field is 1 bit and the UE is configured in transmission mode 1-9, a report is triggered for serving cell c, if the CSI request field is set to '1'. If the CSI request field is 1 bit and the UE is configured in transmission mode 10, a report is triggered for a set of CSI process(es) for serving cell c corresponding to the higher layer configured set of CSI process(es) associated with the value of CSI request field of '01' in Table 3 below, if the CSI request field is set to '1'.

If the CSI request field size is 2 bits and the UE is configured in transmission mode 1-9 for all serving cells, a report is triggered according to the value in Table 2 below corresponding to aperiodic CSI reporting. If the CSI request field size is 2 bits and the UE is configured in transmission mode 10 for at least one serving cell, a report is triggered according to the value in Table 3 below corresponding to aperiodic CSI reporting. For a given serving cell, if the UE is configured in transmission modes 1-9, the "CSI process" in Table 3 below refers to the aperiodic CSI configured for the UE on the given serving cell. A UE is not expected to be configured by higher layers with more than 5 CSI processes in each of the $1^{st}$ and $2^{nd}$ set of CSI process(es) in Table 3 below.

TABLE 2

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

TABLE 3

| Value of CSI request field | Description |
|---|---|
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

A UE is not expected to receive more than one aperiodic CSI report request for a given subframe. If a UE is configured with more than one CSI process for a serving cell, the UE, on reception of an aperiodic CSI report request triggering a CSI report according to Table 3 above, is not expected to update CSI corresponding to the CSI reference resource for all CSI processes except the max $(N_{-x}-N_u, 0)$ lowest-indexed CSI processes for the serving cell associated with the request, when the UE has $N_u$ unreported CSI processes associated with other aperiodic CSI requests for the serving cell. A CSI process associated with a CSI request shall only be counted as unreported in a subframe before the subframe where the PUSCH carrying the corresponding CSI is transmitted. $N_{CSI-P}$ is the maximum number of CSI processes supported by the UE for the serving cell. For FDD, $N_x=N_{CSI-P}$. For TDD, if the UE is configured with four CSI processes for the serving cell, $N_x=N_{CSI-P}$, and if the UE is configured with two or three CSI processes for the serving cell, $N_x=3$. If more than one value of $N_{CSI-P}$ is included in the UE-EUTRA-Capability, the UE assumes a value of $N_{CSI-P}$ that is consistent with its CSI process configuration. If more than one consistent value of $N_{CSI-P}$ exists, the UE may assume any one of the consistent values.

Dual connectivity is described. Dual connectivity is an operation where a given UE consumes radio resources provided by at least two different network points (master eNB (MeNB) and secondary eNB (SeNB)) connected with non-ideal backhaul while in RRC CONNECTED. That is, the UE receives two kind of services by the dual connectivity. One of the services is received from the MeNB directly. The MeNB is an eNB which terminates at least S1-MME and therefore act as mobility anchor towards the core network (CN) in dual connectivity. The other service is received from the SeNB. The SeNB is an eNB which provides additional radio resources for the UE, which is not the MeNB, in dual connectivity. Further, the service may be moved between the macro eNB and SeNB depending on the UE's requirement or load status of the eNBs. A master cell group (MCG) refers the group of the serving cells associated with the MeNB, comprising of the primary cell (PCell) and optionally one or more secondary cells (SCells). A secondary cell group (SCG) refers the group of the serving cells associated with the SeNB, comprising of primary SCell (PSCell) and optionally one or more SCells.

Figure 6:
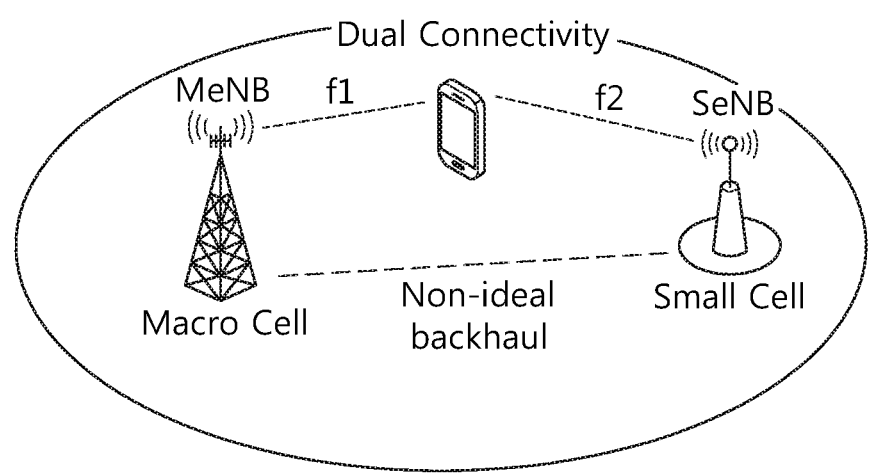
FIG. 6 shows inter-node radio resource aggregation for dual connectivity.

FIG. 6 shows inter-node radio resource aggregation for dual connectivity. Referring to FIG. 6, inter-node radio resource aggregation is a potential solution for improving per-user throughput. This can be done by aggregating radio resources in more than one eNB for user plane data transmission. Depending on realization of this solution, signaling overhead towards the CN can potentially be saved by keeping the mobility anchor in the macro cell.

As described above, as the UE has limited aperiodic CSI processing capability, it may be necessary to consider how to split aperiodic CSI processing capability when dual connectivity is configured. More specifically, in terms of UE capability, the UE can report the aperiodic CSI per band and/or band combinations. However, in terms of processing capability of aperiodic CSI report, the UE can only report the aperiodic CSI by the maximum number of aperiodic CSI reports at one subframe, which is 5, to limit UE complexity in terms of aperiodic CSI processing.

When the UE is not configured with CoMP operation, since the maximum number of carriers aggregated in dual connectivity may not exceed 5, even with dual connectivity, the maximum aperiodic CSI process may not exceed the processing capability of aperiodic CSI report. However, it is possible that the UE may receive more than one aperiodic CSI report request for a given subframe, i.e. one from the MeNB and the other from the SeNB. Thus, in dual connectivity, the UE may not be expected to receive more than one aperiodic CSI report request for a given subframe per carrier group (i.e. at most one in MCG and SCG, respectively).

Further, when the UE is configured with transmission mode 10 in a serving cell, the UE is not expected to be configured by higher layers with more than 5 CSI processes in each of the $1^{st}$ or $2^{nd}$ set of CSI process(es) in Table 3 above. Depending on CoMP configuration in MCG and SCG, potentially, the UE may not be expected to be configured by higher layers with more than 4 CSI processes in the $1^{st}$ or $2^{nd}$ set of serving cells in Table 2 above or $1^{st}$ or $2^{nd}$ set of CSI process(es) in table 3 above, when the UE is configured with dual connectivity (i.e. connected to both MCG and SCG).

Since the UE has the limited processing capability of aperiodic CSI report (e.g., maximum report of aperiodic CSI is 5), it is necessary that the MeNB and SeNB should coordinate how to split the processing capability of aperiodic CSI report such that the maximum aperiodic report requested in one subframe is maintained. Without this coordination, the UE complexity may considerably increase or the UE may have to drop/ignore certain aperiodic CSI request (perform only the maximum number of aperiodic CSI processing within its capability). Either case is not desirable as it increases the UE cost or ambiguity of CSI feedback at eNB side (and thus aperiodic CSI feedback may not be so useful).

Hereinafter, a method for splitting the processing capability of aperiodic CSI report according to an embodiment of the present invention is described. According to an embodiment of the present invention, based on certain coordination, the maximum number of aperiodic CSI report between MeNB and SeNB may be divided semi-statically. The information on dividing the maximum number of aperiodic CSI report between MeNB and SeNB may be exchanged via X2 interface. For example, the MeNB may be assigned with 3 aperiodic CSI report, whereas the SeNB may be assigned with 2 aperiodic CSI report. That is, if it is assumed that m is the number of aperiodic CSI assigned to the MeNB, then 5-m may be the number of aperiodic CSI assigned to the SeNB.

The number of aperiodic CSI assigned to the MeNB, i.e. m, may be configured to the UE by higher layer signalling. That is, the UE may not be expected to be configured by higher layers with more than m CSI processes in the $1^{st}$ or $2^{nd}$ set of serving cells in Table 2 above or $1^{st}$ or $2^{nd}$ set of CSI process(es) in table 3 above for MCG. Further, the UE may not be expected to be configured by higher layers with more than 5-m CSI processes in the $1^{st}$ or $2^{nd}$ set of serving cells in Table 2 above or $1^{st}$ or $2^{nd}$ set of CSI process(es) in table 3 above for SCG. If m is not configured, default value for m may be 5. When the UE is not configured with dual connectivity, m may be 5.

Alternatively, m may be coordinated only between eNBs and not known to the UE. In this case, the UE may not be expected to be configured by higher layers with more than 5 CSI processes in any of the following sets:

(1) $1^{st}$ set of serving cells (per Table 2 above)+$1^{st}$ set of CSI process (per Table 3 above)

(2) $1^{st}$ set of serving cells (per Table 2 above)+$2^{nd}$ set of CSI process (per Table 3 above)

(3) $2^{nd}$ set of serving cells (per Table 2 above)+$1^{st}$ set of CSI process (per Table 3 above)

(4) $2^{nd}$ set of serving cells (per Table 2 above)+$2^{nd}$ set of CSI process (per Table 3 above)
(5) $1^{st}$ set of CSI process (per Table 3 above)+$1^{st}$ set of CSI process (per Table 3 above)
(6) $1^{st}$ set of CSI process (per Table 3 above)+$2^{nd}$ set of CSI process (per Table 3 above)
(7) $2^{nd}$ set of CSI process (per Table 3 above)+$2^{nd}$ set of CSI process (per Table 3 above)

With enhanced interference management and traffic adaptation (eIMTA), if the $1^{st}$ group of CSI process(es) and $2^{nd}$ group of CSI process(es) are introduced, the total of any set/group from the MeNB and any set/group from the SeNB should not exceed UE capability.

Hereinafter, a method for processing aperiodic CSI according to an embodiment of the present invention is described. When the UE is requested to report more aperiodic CSI reports than its capability/processing limit, for assigning UE's capability, the UE may assign its capability to the MeNB (or alternatively the SeNB) first. For example, if 4 aperiodic CSI reports are requested for the MeNB, then, only one report may be processed for the SeNB. Within a CG, SCell index may be used to prioritize or select CSI reports/processes. For example, if SCG has only one aperiodic CSI processing capability left where the indicated CSI is for SCell index=1 and 2, aperiodic CSI on SCell index=1 may be performed. If there are multiple aperiodic CSI processes associated with a cell, CSI process ID may be further used for prioritization. In terms of reporting, for aperiodic CSI process which cannot be processed due to its processing capability limitation, the UE may report stale data if available. Otherwise, it can transmit out of range (OOR) or zero ('0') values. Alternatively, the UE may assign its capability to MeNB/SeNB in a take-turn way starting with the MeNB (or alternatively the SeNB). Up to 5 processing capability may be assigned to aperiodic CSI processes/cells for MCG and SCG by allocating one to each at a time until the total processing capability is used up. In terms of prioritization within a CG, SCell index (PCell/PSCell has the highest priority) and CSI process ID may be used.

For transmission of aperiodic CSI, If the UE cannot process the requested aperiodic CSI due to processing capability limit, the UE may drop aperiodic CSI report if no data is scheduled nor HARQ-ACK piggybacked (i.e., PUSCH without data/HARQ-ACK). Or, if the UE cannot process the requested aperiodic CSI due to processing capability limit and the data is also scheduled (i.e., PUSCH with data), the aperiodic CSI may be omitted from PUSCH and PUSCH with data and HARQ-ACK (if any) is transmitted. In this case, the eNB may need to blindly detect PUSCH with or without CSI. When this occurs, the priority when power limited case should be same as PUSCH with CSI. PUSCH power may be determined assuming no CSI. Or, if the UE cannot process the requested aperiodic CSI due to processing capability limit, then the UE may fill aperiodic CSI with zero ('0') or a UE reports OOR and transmit PUSCH. In terms of priority and power, it follows PUSCH with CSI (and HARQ-ACK if any). Or, if the UE cannot process the requested aperiodic CSI due to processing capability limit, then the UE may use stale aperiodic CSI if available. In other words, the UE may not update CSI results on aperiodic CSI process which is deprioritized due to UE processing capability. If the stale aperiodic CSI is not available, the UE may transmit OOR or zero ('0') instead of dropping aperiodic CSI report(s).

Alternatively, to share the capability, MCG and SCG may utilize time division multiplexing (TDM) approach where aperiodic CSI reports can be transmitted in a subset of subframes for each MCG and SCG respectively (or only for either MCG or SCG). In those subframes configured for each CG, aperiodic CSI report on carriers on the CG may be reported or reported with higher priority. One example is that if the SCG operates in TDD, uplink subframe of the SCG may report aperiodic CSI for SCG, whereas in other subframes, the UE may report aperiodic CSI for MCG if the MCG operates in FDD. The configuration may be implicitly or explicitly configured. When implicitly configured, TDD uplink may have higher priority. In other words, aperiodic CSI trigger for TDD uplink may have higher priority over aperiodic CSI trigger for FDD uplink. This is because aperiodic CSI request can be triggered in other subframes for FDD.

In terms of zero-power CSI-RS configuration or CSI-interference measurement (IM), the restriction may apply within a CG only. In other words, there is no relationship between two CGs.

Figure 7:
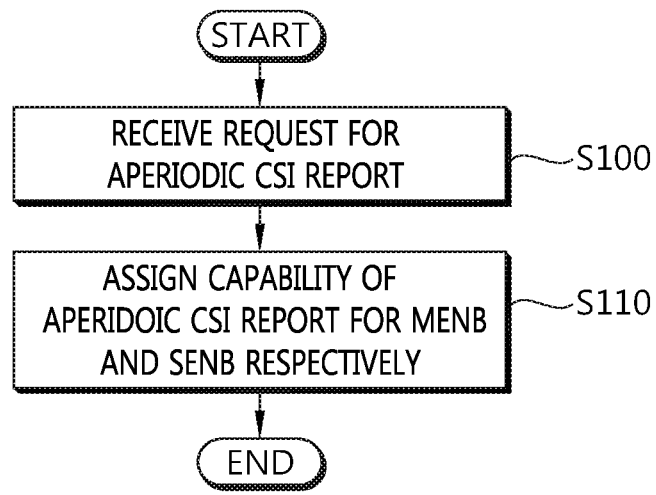
FIG. 7 shows an example of a method for processing aperiodic CSI according to an embodiment of the present invention.

FIG. 7 shows an example of a method for processing aperiodic CSI according to an embodiment of the present invention. In step S100, the UE receives a request for aperiodic CSI report. In step S110, the UE assigns capability of the aperiodic CSI report for the MeNB and SeNB in dual connectivity. The number of the capability of the aperiodic CSI report may be 5. The UE may process the aperiodic CSI report up to the capability of the aperiodic CSI report. The request for aperiodic CSI report may be received at most once for a subframe per carrier group. The capability of the aperiodic CSI report for the MeNB may be configured by a higher layer.

Figure 8:
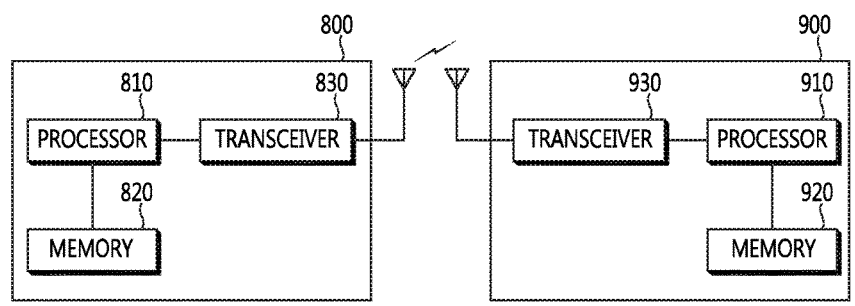
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for reporting, by a user equipment (UE), aperiodic channel state information (CSI) for dual connectivity in a wireless communication system, the method comprising:

receiving, by the UE, a first aperiodic CSI report request for a master cell group (MCG) from the MCG and a second aperiodic CSI report request for a secondary cell group (SCG) from the SCG;

assigning, by the UE, a capability of reporting the aperiodic CSI for the MCG and the SCG up to a maximum number of the capability of reporting the aperiodic CSI based on the first aperiodic CSI report request and the second aperiodic CSI report request; and reporting, by the UE, the aperiodic CSI for up to 5 CSI processes based on the first aperiodic CSI report request and the second aperiodic CSI report request, wherein the UE is connected to both the MCG and the SCG in dual connectivity, and wherein, when a number of CSI processes based on the first aperiodic CSI report request and the second aperiodic CSI report request exceeds 5, the aperiodic CSI for remaining CSI processes more than 5 are not updated.

2. The method of claim 1, wherein the maximum number of the capability of reporting the aperiodic CSI is 5.

3. The method of claim 1, wherein the capability of reporting the aperiodic CSI for the MCG and the SCG is configured by a higher layer.

4. The method of claim 3, wherein the capability of reporting the aperiodic CSI is assigned for the MCG first.

5. The method of claim 3, wherein the capability of reporting the aperiodic CSI is assigned for the MCG and the SCG alternately.

6. The method of claim 1, wherein the first aperiodic CSI report request and the second aperiodic CSI report request are received at most once for a subframe for the MCG and the SCG, respectively.

7. A user equipment (UE) in a wireless communication system, the UE comprising:

a memory;

a transceiver; and a processor, operably coupled to the memory and the transceiver, and configured to:

control the transceiver to receive a first aperiodic channel state information (CSI) report request for a master cell group (MCG) from the MCG and a second aperiodic CSI report request for a secondary cell group (SCG) from the SCG;

assign a capability of reporting the aperiodic CSI for the MCG and the SCG up to a maximum number of the capability of reporting the aperiodic CSI based on the first aperiodic CSI report request and the second aperiodic CSI report request; and control the transceiver to report the aperiodic CSI for up to 5 CSI processes based on the first aperiodic CSI report request and the second aperiodic CSI report request, wherein the UE is connected to both the MCG and the SCG in dual connectivity, and wherein, when a number of CSI processes based on the first aperiodic CSI report request and the second aperiodic CSI report request exceeds 5, the aperiodic CSI for remaining CSI processes more than 5 are not updated.

8. The UE of claim 7, wherein the maximum number of the capability of reporting the aperiodic CSI is 5.

9. The UE of claim 7, wherein the capability of reporting the aperiodic CSI for the MCG and the SCG is configured by a higher layer.

10. The UE of claim 9, wherein the capability of reporting the aperiodic CSI is assigned for the MCG first.

11. The UE of claim 9, wherein the capability of reporting the aperiodic CSI is assigned for the MCG and the SCG alternately.

12. The UE of claim 7, wherein the first aperiodic CSI report request and the second aperiodic CSI report request are received at most once for a subframe for the MCG and the SCG, respectively.

* * * * *